United States Patent [19]

Dauel et al.

[11] 4,371,314

[45] Feb. 1, 1983

[54] AIR JET HELICOPTER ROTOR HUB AND AIR DISTRIBUTION SYSTEM

[75] Inventors: Darold R. Dauel, Pleasonton; Clarence R. Kiesling, Grand Island; Jerry L. May, Kearney, all of Nebr.

[73] Assignee: Henderson & Sturm, Omaha, Nebr.

[21] Appl. No.: 251,608

[22] Filed: Apr. 6, 1981

[51] Int. Cl.[3] ............................................. B64C 27/18
[52] U.S. Cl. .................................................. 416/20 A
[58] Field of Search .................... 416/20, 20 A, 90 A

[56] References Cited

U.S. PATENT DOCUMENTS

| | | | |
|---|---|---|---|
| 606,986 | 7/1898 | Carter et al. | 115/34 |
| 2,429,646 | 10/1947 | Pullin | 244/17 |
| 2,702,601 | 2/1955 | Nagler | 170/135.4 |
| 2,831,543 | 4/1958 | Matthews | 170/135.4 |
| 2,915,129 | 12/1959 | Laskowitz | 170/135.4 |
| 2,921,758 | 1/1960 | Bodde | 244/17.11 |
| 3,220,670 | 11/1965 | Fuller | 244/17.17 |
| 3,816,019 | 6/1974 | Norman et al. | 416/20 |
| 3,830,588 | 8/1974 | Nagler | 416/20 |
| 3,843,282 | 10/1974 | Nagler | 416/20 |

Primary Examiner—Edward L. Roberts
Attorney, Agent, or Firm—Henderson & Sturm

[57] ABSTRACT

An air jet helicopter rotor and air distribution system of the semi-rigid type, having tension straps, in which the hub is connected to a rotatable mast shaft by a teetering hinge; the mast shaft is supported by a thrust bearing; and the rotors, the hub and an upper rotatable plenum chamber which surrounds the mast shaft and from which compressed air is distributed to each rotor through flexible ducts all rotate with the mast shaft. Below and adjoining the rotatable plenum chamber and also surrounding the mast shaft is a stationary plenum chamber which is mounted atop the thrust bearing housing and which transports compressed air from a source within the helicopter into the rotatable plenum chamber. Self-centering, self-aligning air seals at the adjoinments of the plenum chambers and the stationary plenum chamber and the mast shaft allow for flexing throughout the system as well as the usual flapping and rocking movements of the rotor blades.

14 Claims, 4 Drawing Figures

AIR JET HELICOPTER ROTOR HUB AND AIR DISTRIBUTION SYSTEM

BACKGROUND OF THE INVENTION

1. Field of the Invention

The present invention relates generally to air jet helicopters and more particularly to rotor hub assemblies and systems for distributing air to the rotor blades.

2. Description of the Prior Art

One of the most critical problems in the field of air jet helicopters is counter-acting the centrifugal force of the rotating blades when the rotors must be both hollow and lightweight. This problem of centrifugal force also complicates the requirement that the rotors must be rotatable about their longitudinal axes for adjusting their pitch in order to control the flight of the helicopter. A practical and common solution to both problems, adaptable to two-bladed rotors, is the provision of dual tension straps which are comprised of pluralities of flat steel strapping which span the distance between the airfoil portions (blades) of each rotor and are located on either side of the rotor hub. Upper and lower strap guides at the rotor hub level are generally provided on either side of the rotor hub for maintaining the required strap span when the rotors flex upwardly or downwardly. Thus the tension straps are necessarily spaced apart from the longitudinal axis of the two rotors.

Due to the fact that the tension straps are necessarily spaced apart from the longitudinal axes of the rotors, they torsionally resist the required changes in blade pitch for flight control of the helicopter. It follows that the further they are spaced apart from the rotor axes the more they will resist the pitch control systems. The resultant load on the pitch control systems requires that they have more heavy duty parts and are provided with greater mechanical advantages in order to control the flight of an air jet helicopter than what would be required for a comparable conventional craft.

Another problem in the design of air jet helicopters is the need to provide for vertical flapping (up and down) and horizontal dragging (back and forth) of the rotor blades. A common approach is to integrate some form of a universal ball joint through or around which air flow to the rotors is conducted. It is also common in the prior art to locate the universal ball joint in the rotor hub itself in order to minimize the shift in the axis of the tip-path plane (rotor disc) from that of the rotor mast shaft when the helicopter is in forward, rearward or sidewards flight.

Such use of universal ball joints has many drawbacks. They are expensive to manufacture and maintain. Additionally, they usually preclude the use of non-standard bearings, they require wear-resistant materials, and they are heavy structures usually located far above the center of gravity of the helicopter fuselage. Furthermore, when the universal ball joint is located within or integral with the rotor hub, dual tension straps must be further spaced apart to accomodate their size, further increasing the torsion load on the pitch control systems. The tension strap spacing problem may be additionally aggravated by the rotor hub width requirements when either or both air conduits and a universal ball joint is located within or integral with the rotor hub.

SUMMARY OF THE INVENTION

An object of the present invention is the provision of an improved rotor hub assembly and air distribution system for an air jet helicopter.

Another object is to provide a rotor hub assembly and air distribution system for an air jet helicopter with the least possible restrictions on how close together dual tension straps may be placed.

A further object of the invention is to provide a rotor hub assembly and air distribution system for an air jet helicopter which does not use the universal ball and socket principle.

Still another object is to provide improved air seals in a rotor hub assembly and air distribution system for an air jet helicopter.

A still further object is to provide a rotor hub assembly and air distribution system for an air jet helicopter which requires only standard bearings for its primary rotation.

Yet another object of the invention is the provision of a rotor hub assembly and air distribution system for an air jet helicopter with minimal turbulence and air pressure loss in the flow of air through its plenums and ducts.

Yet a further object of the invention is to provide a rotor hub assembly and air distribution system for an air jet helicopter with equal delivery of compressed air to each rotor.

Yet a still further object of the invention is to provide a rotor hub assembly and air distribution system for an air jet helicopter which reacts to diverse force vectors upon the rotor blades with a minimum of air pressure loss and with economy in manufacture and operation.

According to the present invention, the foregoing and present objects are obtained by providing a rotor system of the semi-rigid type in which the rotor blades are connected to the hub at bearings in which they turn axially in response to the pitch control systems and in which the rotor hub is free to tilt with respect to a rotatable mast shaft by being supported at its upper end on a teetering hinge assembly. The teetering hinge assembly is comprised of a bearing member mounted atop the rotor hub either side of the mast shaft and mating journals affixed on opposite sides of the mast shaft. Thus, the tension straps may each be located adjacent the bearing members, one one either side of the mast shaft, a distance from the mast shaft no greater than that which is sufficient to allow for the width of each of the bearing members. This relationship results from the fact that at the tension strap level, the rotor hub need only support the rotor bearings, the teetering hinge and the tension strap guides.

The remaining elements of the rotor and air distribution systm are below the level of the tension straps, except for two flexible ducts, each of which transports compressed air to the hollow portion of each rotor shaft and is located directly beneath it. These elements include, in descending elevational order, a rotatable plenum chamber surrounding the mast shaft and connected thereto so as to rotate with it for transporting compressed air to the flexible ducts, a stationary plenum chamber surrounding the mast shaft and attached to the fuselage of the helicopter through a thrust bearing housing for transporting compressed air from a source within the helicopter to the rotatable plenum chamber, and a thrust bearing assembly for supporting the rotatable mast shaft attached to the fuselage of the helicopter. In addition, there are self-centering self-aligning air seal assemblies at the adjoinments of the rotatable and the stationary plenum chambers and the mast shaft. The air seals minimize air pressure losses and assist the teetering hinge and flexible ducts in providing for movement between the elements of the system as necessitated by normal operation and for precluding the need for a ball and socket type universal joint.

Other objects, advantages and novel features of the present invention will become apparent from the following detailed description of the invention when considered in conjunction with the accompanying drawings.

DESCRIPTION OF THE PREFERRED EMBODIMENTS

Figure 1:
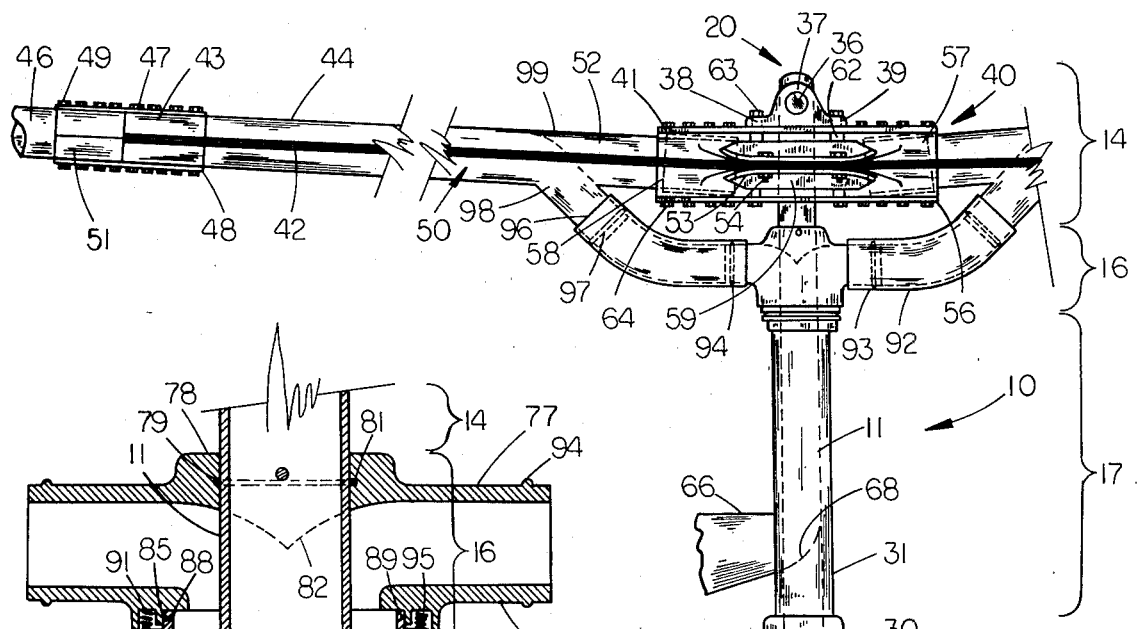
FIG. 1 is a partial side elevational view of an embodiment of the present invention.

Referring now to the drawings wherein like reference numerals designate identical or corresponding parts throughout the several views, and more particularly to FIG. 1 whereon the rotor hub assembly is depicted generally at 10 and is connected to rotatable rotor mast shaft 11 by a teetering hinge assembly, depicted generally at 20. In this embodiment, the rotatable mast shaft 11 is a hollow steel tube which is connected to the helicopter fuselage through a thrust bearing assembly, depicted generally at 30. Thrust bearing assembly 30 includes housing 12 upon either side of which are mounting brackets 13 for affixation to the helicopter fuselage in a manner known to those with ordinary skill in the art. As can be seen in FIG. 1, the rotor mast shaft 11 is somewhat elongated to provide space, in addition to the teetering hinge assembly 20, for the elements comprising the air distribution system, as well as, axial space to accomodate a swash plate assembly (not shown). In order to facilitate the description of the various elements of the air distribution system which follows, that portion of rotor mast shaft 11 which protrudes above thrust bearing assembly 30 will be referred to as comprised of three segments. These are, in descending order, an exposed segment 14 to which the teetering hinge assembly 20 is connected, an upper protruding segment 16, and a lower protruding segment 17. As it is anticipated that the swash plate will be located adjacent to segment 17, it is the longest of the three segments.

Figure 3:
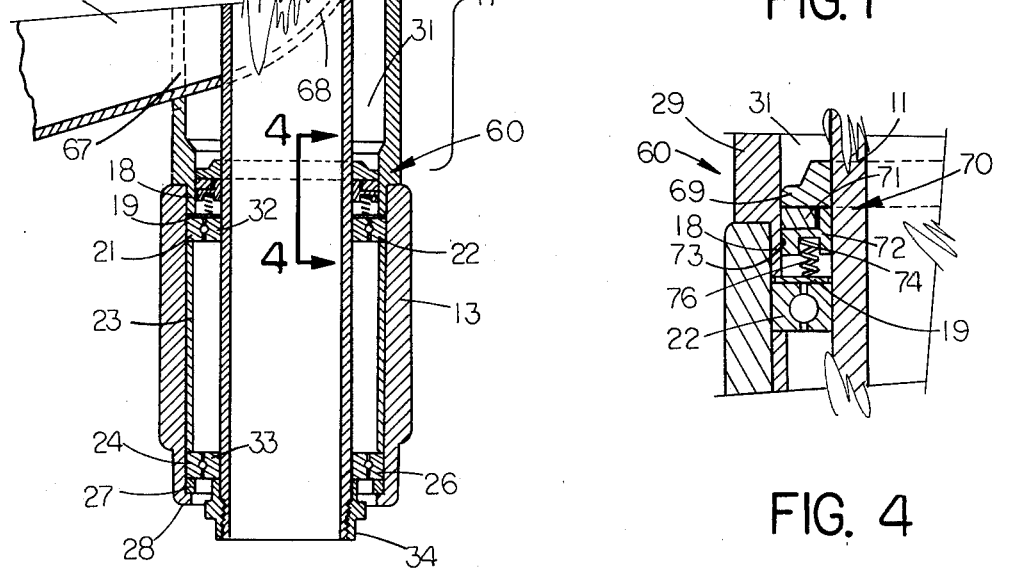
FIG. 3 is an enlarged partial cross-sectional side elevational view of the two plenum chambers and the thrust bearing assembly of an embodiment of the present invention; and, FIG. 4 is a further enlarged partial cross-sectional side elevational view showing the air seal assembly at the adjoinment of the mast shaft and the stationary plenum assembly of an embodiment of the present invention.

The parts of thrust bearing assembly 30 so far indicated which are non-rotatable are housing 12 and mounting brackets 13. As best can be seen in FIG. 3, the other non-rotatable parts include in descending vertical order as they appear in FIG. 3, a lower seal ring 18, a spring support ring 19, an outer race 21 of ball bearing 22, a ball bearing spacer sleeve 23, an outer race 24 of ball bearing 26, and a lower support ring 27. Support ring 27 rests against the upper horizontal surface of radially inwardly extending flange 28 of housing 12. In assembling these latter non-rotatable parts they are placed within housing 12 in reverse order as introduced herein. After being so assembled, a lower seal ring 18 and the lower adjoining non-rotatable parts are then held in position by the bottom horizontal edge of hollow air tube 29 of stationary plenum chamber 31 (to be more fully described below), which edge is secured to the top edge of housing 12 and extends sufficiently inwardly thereof.

The rotatable parts of thrust bearing assembly 30 include, in descending vertical order as depicted in FIG. 3, inner race 32 of upper bearing 22, inner race 33 of lower bearing 26, and mast shaft nut 34 which is threaded to mate with external threading on the portion of mast shaft 11 which extends below where lower bearing 26 is located on mast shaft 11. It should be noted that the external threads on the end of mast shaft 11 do not protrude beyond the exterior diameter of the adjacent portion of mast shaft 11 and that the threaded portion of mast shaft nut 34 similarly extends radially inwardly a corresponding distance in order that its unthreaded portion will first pass over the threaded end of mast shaft 11 on installation and then mate with the end of mast shaft 11 in a fashion such that mast shaft nut 34 will contact and support inner race 33 of thrust bearing 26. Inner races 32 and 33 are secured to mast shaft 11 in a manner known to those having ordinary skill in the art.

Figure 2:
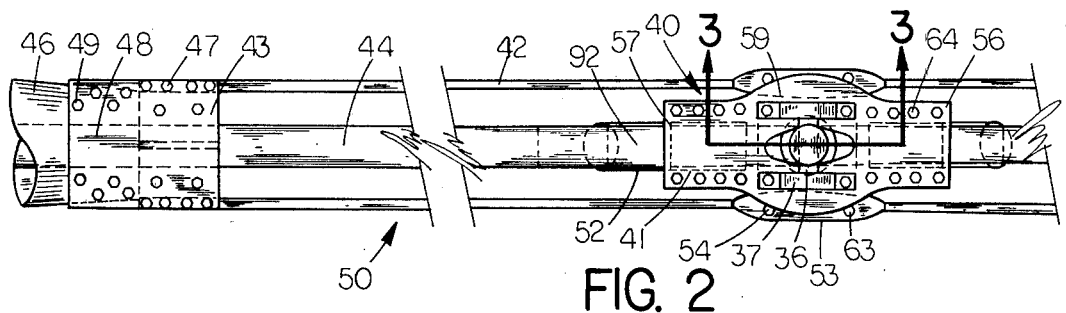
FIG. 2 is a partial top plan view of an embodiment of the present invention.

Teetering hinge assembly 20 at the upper end of mast shaft 11 can best be understood by viewing both FIGS. 1 and 2 and includes two teetering hinge pins 36 of circular cross-section projecting radially at 180 degrees to each other and secured to mast shaft 11 and two pillow blocks 37 located adjacent to and on either side of mast shaft 11 into which teetering pins 36 are journalled. Each pillow block 37 has two bolt receiving apertures 38 located in each of two outwardly extending knees 39 for securing said pillow blocks 37 to rotor hub assembly 10 as will be set forth hereinbelow.

Rotor hub assembly 10 to which teetering hinge assembly 20 is secured, includes a frame depicted generally at 40, a dual tension strap assembly depicted generally at 50, and rotor socket sleeves 41. The present invention, having a semi-rigid rotor system which employs a teetering hinge, will have but two rotor shafts and rotor blades, one on each side of the mast shaft, and both normal to the teetering hinge pins. Because each rotor, as well as the parts of the rotor hub either side of the mast shaft are identical, numerical designations on only one side thereof will be appropriately assigned for convenience and simplicity. Dual tension strap assembly 50 includes two sets of a plurality of thin flat straps 42, which may be of stainless steel strapping material, laid back to back, and each extending between a separate pair of tension strap holding blocks 43, one block for each rotor, located on hollow rotor shaft 44 at a point adjacent the innermost end of the rotor airfoil blade 46. Each of the holding blocks 43 are slotted along a longitudinal outside edge to receive an end of a set of tension straps 42, and additionally have pluralities of bolt holes in cooperating alignment with bolt holes in tension straps 42 and upper and lower cover plates 48. Semi-circular channels are located on the side of holding blocks 43 opposite the tension strap slot for the receipt of hollow rotor shaft 44. Bolt and nut sets 47 secure tension straps 42 within holding blocks 43, cover plates 48 to holding blocks 43, and, hence, hollow rotor shaft 44 within the opposing shaped channels of two adjacent holding blocks 43. Upper and lower cover plates 48, extend outwardly rotor spanwise beyond the end of tension straps sets 42 and contain airfoil holding blocks 51, both of which have similar provisions to holding blocks 43 for the receipt of bolt and nut sets 49 for the securement thereof to blade 46. Holding blocks 51 have cross-sectional channels appropriately located and shaped to receive airfoil blade 46.

When rotor shaft 44 is turned in socket sleeve 41 by a pitch arm (not shown) located at approximately 52 (see FIG. 1), on rotor shaft 44, the rocking motion created thereby is translated to airfoils 46 as a result of said rotor shaft 44 being rigidly secured to holding blocks 51. As can be well appreciated, the centrifugal load upon rotor blades 46 is transmitted, consecutively, through airfoil holding blocks 51, bolt and nut sets 49, cover plates 48, bolt and nut sets 47, tension strap holding blocks 43, and tension strap sets 42 to the identical parts on the opposite rotor in reverse order.

Completing the dual tension strap assembly 50 in this embodiment are two sets of centering guides 53, having an upper and lower member each, which are located substantially level with the intersection of the axes of each rotor shaft 44 and which are rigidly attached to the rotor hub assembly 10 as hereinafter described. In order to preclude creasing of the straps when the rotor blades cone upwards or droop downwards, either end of each guide 53 is curved away from tension strap sets 42 at the point at which contact is continuous. Short of said point where continuous contact ends, in either side of the mast shaft, are a nut and bolt set 54 which is accepted through corresponding holes in tension strap guides 53 and tension strap sets 42 and serves to maintain the orderly orientation of said parts, although the opposing centrifugal load of the rotor blades is primarily carried throughout the length of tension strap sets 42.

The remainder of the rotor hub assembly 10 is comprised of frame 40 having the function of interconnecting the previously described assemblies and members, i.e., the teetering hinge assembly 20, the rotor shaft sockets 41, and the tension strap centering guides 53. The exact configuration, interrelationship, and specific function of these members in the preferred embodiment is depicted in FIGS. 1 and 2. Because the same may be readily understood therefrom, and alternate structures are deemed to be within the ability of those skilled in the art, only a list with numerical references of the elements of frame 40 is included. The general function of the elements comprising frame 40 are to hold the previously listed assemblies and members of the rotor hub 10 assembly together as a rigid unit. These elements are identical top and bottom plates 56, upper rotor shaft socket blocks 57, lower rotor shaft socket blocks 58, upper and lower tension strap guide supports 59, guide support spacers 62, pillow block nut and bolt sets 63, and rotor socket block nut and bolt sets 64. In the embodiment disclosed herein centering guides 53 of tension strap assembly 50 and tension strap guide supports 59 of frame 40 are of unitary construction.

With reference now to FIG. 3 whereon the stationary plenum chamber 31 is shown it should be appreciated that said stationary plenum chamber 31 is effectively rigidly attached to the helicopter fuselage through the rigid attachment of hollow air tube 29 to the top of thrust bearing housing 12, as stated hereinbefore. Air is conducted from a compressed air source within the helicopter fuselage (not shown) to stationary plenum chamber 31 by air duct 66 through air inlet port 67. Air deflector 68 provides a long radius curve, within stationary plenum chamber 31 and surrounding mast shaft 11, which directs entering air to a shaft-wise longitudinal direction with a minimum of air turbulence.

Figure 4:
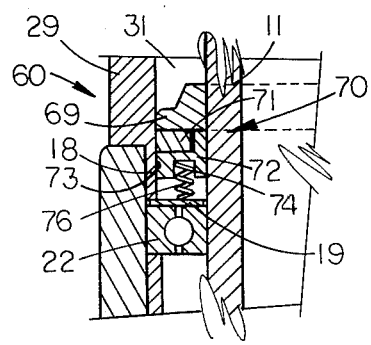

Because of the flexing and bending transmitted primarily from the rotor blades, but additionally to some extent from other parts eventually supported by the rotor mast shaft 11, there, of necessity, will be a minor degree of movement between the rotatable mast shaft 11 and the stationary plenum chamber 31, said movement being made possible by the small clearances existing between the balls and the races of the thrust bearing assembly 30. To avoid a loss of compressed air which would otherwise result when mast shaft 11 flexes, as well as the deleterious effect of foreign particles within said air entering within the ball bearings 22 and 26, a mast shaft air seal assembly depicted generally at 60 is provided. Mast shaft air seal assembly 60 is best understood by referring to FIG. 4. Outwardly radially directed flange ring 69 is rigidly secured to the exterior of mast shaft 11, in a manner known to those with ordinary skill in the art, at approximately the level where its protruding segment 17 is adjacent to the point of securement between stationary plenum chamber 31 and bearing housing 12. It is of sufficient size to substantially gap the space thereinbetween without contacting the interior of stationary plenum chamber 31 as it rotates with mast shaft 11. The lower surface of flange 69 is highly wear resistant and is in constant contact with a slidable seal ring assembly depicted generally at 70. The slidable seal ring assembly 70 includes a long wearing, self-lubricating ring 71, of material such as carbon or Teflon, which is in contact with the wear resistant surface of flange 69. Also included is seal ring 72 of generally "small case" h-shaped cross-section with its long dimension adjacent mast shaft 11 to which ring 71 is bonded and in which is a circumferential depression in its short stroke vertical leg, for containing an elastic o-ring 73. The "small case" h-shaped cross-section of seal ring 72 actually represents only its cross-section through each of a plurality of cylindrically shaped compression spring seats 74 which are circumferentially and equidistantly spaced therewithin. Placed within each of the spring seats 74 is a plurality of compression springs 76 whose thereafter exposed ends contact the upper surface of ring 19, urging the seal ring assembly 70 to maintain contact with the lower wear resistant surface of flange 69. The elastic o-ring 73 and seal ring 72 are of such dimension that elastic o-ring 73 will remain in sealed contact with upper spacer sleeve 18 of thrust bearing assembly 30. It will be appreciated by those skilled in the art that materials are available for the various parts of mast shaft air seal assembly 60 which will economically offer the required wear resistance, long life, self-lubrication and low friction qualities, while at the same time allowing for any amount of vertical or horizontal displacement between the longitudinal axis of the mast shaft 11 and stationary plenum chamber 31.

Again referring to FIG. 3, t-shaped rotatable plenum chamber 77 is shown surrounding mast shaft 11 along its upper segment 16. The vertical portion of rotatable plenum chamber 77 is circular in cross-section with a top opening sized to snugly fit about mast shaft 11 and be rigidly held thereto by clamping means or the like and the bottom opening sized to receive air from stationary plenum 31. The interior of the upper central portion 78 of rotatable plenum chamber 77 has an o-ring depression 79 circumferentially located for the insertion of o-ring 81 and maintenance thereof against the adjacent exterior surface of mast shaft 11. Upper central portion 78 is also formed along its generally horizontal interior surface to form air deflector surfaces 82 adjacent surrounding mast shaft 11 and arcuately dividing and directing the flow of compressed air from stationary plenum chamber 31 into two equal flows in streamlined fashion into the opposing cylindrical hollow horizontal portions 83 of the t-shaped rotatable plenum chamber 77 for low-turbulent transportation of the compressed air into the two hollow rotor shafts 44.

As at the adjoinment of the stationary plenum chamber 31 and the mast shaft flange 69, displacement between the longitudinal axis of the stationary plenum chamber 31 and the rotatable plenum chamber 77 will be experienced. Referring to FIG. 3, a rotatable plenum air seal assembly, depicted generally at 80, includes essentially the same elements as the mast shaft air seal assembly 60 with minor variations. Nevertheless, it does include elements which provide every function as those of the mast shaft air seal assembly 60, said elements including an interiorally threaded outwardly flanged top ring 84 for securement to a matingly threaded top section of stationary plenum chamber 31, a seal ring 86 bonded to a continuous cross-section "small case" h-shaped seal ring 87 having a circumferential o-ring groove 88 for containment of an elastic o-ring 89. The annular edge of the bottom opening of rotatable plenum chamber 77 has a depending annular ring 85 for adjacent fit around the upper portion of the long leg of "small case" h-shaped seal ring 87, to mate therewith and form an air tight joint with o-ring 89. Radially outward of depending ring 85 and within the annular edge of the bottom opening of plenum 77 are a plurality of circumferentially and equidistantly spaced cylindrically shaped seats 95 for a plurality of compression springs 91 whose exposed ends contact the horizontal element of the cross-section of the "small-case" h-shaped seal ring 87, thus urging long wearing, self-lubricating seal ring 86 against the wear resistant surface of flange ring 84. Due to the increased distance the adjoining portions of stationary plenum chamber 31 and rotatable plenum chamber 77 are from thrust bearing assembly 30, there is a greater need for maintaining centering and alignment of the two then is experienced adjacent mast shaft air seal assembly 60, and the wear resistant upper surface of top flange ring 84 has a correspondingly longer dimension. It should be appreciated that allowance for flexing, stretching, and twisting of the diverse elements of my invention with respect to their rigid connection to the fuselage due to the effect of various forces upon the rotor blades primarily, and the interconnecting elements secondarily, is more than adequately accomodated through the combined attributes of the teetering hinge assembly 20, the mast shaft air seal assembly 60, the rotatable plenum air seal assembly 80, and two flexible ducts 92.

Referring now to FIG. 1, it can be seen that each of the two flexible ducts 92 is force fitted at a first end 93 over circumferential projection 94 on the exterior of each of the horizontally extending portions 83 of rotatable plenum chamber 77. The second end 96 of each flexible duct 92 is force fitted over a circumferential projection 97 near the lower end of each of two obtuse angularly depending projecting duct members 98 which extend the compressed air passageway from the flexible ducts 92 into the hollow rotor shafts 44 in an outward direction. Appropriately arcuately surfaced deflection members 99 are located within the rotor shafts adjacent the projections 98 for streamlined direction of air flow to the rotor blades 46. Said air deflection members have appropriate circumferential depressions and o-rings for the prevention of air pressure loss, neither of which are shown.

Obviously numerous modifications and variations of the present invention are possible in light of the above teachings. It is therefore to be understood that within the scope of the appended claims, the invention may be practiced otherwise than is specifically described therein.

We claim:

1. In an air jet helicopter, having a fuselage, a compressed air source, hollow rotor blades, a rotor hub, pitch control systems, and tension straps, a rotor hub assembly and air distribution system comprising:

a thrust bearing means secured to the fuselage for supporting a rotatable mast shaft in a somewhat vertical orientation, said mast shaft having a lower protruding segment, an upper protruding segment and an exposed segment, and for resisting vertical forces acting upon said mast shaft;

a stationary plenum means attached to the fuselage and surrounding the lower protruding segment of the mast shaft for receiving compressed air from the compressed air source and for the transportation thereof to the hollow rotor blades;

mast shaft air seal means for preventing air pressure loss from the adjoinment of the rotatable mast shaft and the stationary plenum means;

a rotatable plenum means secured to and surrounding the upper protruding segment of the mast shaft for receiving compressed air from the stationary plenum means and for transportation thereof to the hollow rotor blades;

rotatable plenum air seal means for preventing air pressure loss from the adjoinment of the stationary plenum means and the rotatable plenum means;

two flexible duct means each attached at a first end to the rotatable plenum means and at a second end to a hollow rotor blade for transporting compressed air from the rotatable plenum means to the hollow rotor blades and for allowing the hollow rotor blades to tilt and rock with respect to the mast shaft; and a teetering hinge means connecting the exposed segment of the mast shaft to the rotor hub for allowing the rotor hub to tilt with respect to the mast shaft and for minimizing the load of the tension straps on the pitch control systems.

2. In an air jet helicopter, a rotor hub assembly and air distribution system as set forth in claim 1 wherein the mast shaft air seal means includes:

a seal ring means for allowing limited variations between the longitudinal and axial orientation of the mast shaft and the stationary plenum means; and biasing means for urging the seal ring means into sealing contact with the adjacent portions of the mast shaft and the stationary plenum means.

3. In an air jet helicopter, a rotor hub assembly and air distribution system as set forth in claim 2 wherein the biasing means includes a plurality of compression springs each of which have a first end in contact with the adjacent portion of the stationary plenum means and a second end seated within a recess in the seal ring means.

4. In an air jet helicopter, a rotor hub assembly and air distribution system as set forth in claim 2 wherein the slidable seal ring means further includes an elastic O-ring means within a cooperating depression in a generally vertically oriented surface of the seal ring means for maintaining frictional contact with a surface of one of the adjoining structures.

5. In an air jet helicopter, a rotor hub assembly and air distribution system as set forth in claim 2 wherein the seal ring means further includes a friction-resistant means for rotational contact with one of the adjoining structures.

6. In an air jet helicopter, a rotor hub assembly and air distribution system as set forth in claim 5 wherein the portion of the adjoining structure in contact with the friction-resistant means is of a wear-resistant material.

7. In an air jet helicopter, a rotor hub assembly and air distribution system as set forth in claims 1 or 2 wherein the rotatable plenum air seal means includes:
 a seal ring means for allowing limited variations between the longitudinal and axial orientations of the rotatable plenum means and the stationary plenum means; and
 biasing means for urging the seal ring means into sealing contact with the adjacent portions of the rotatable plenum means and the stationary plenum means.

8. In an air jet helicopter, a rotor hub assembly and air distribution system as set forth in claim 7 wherein the biasing means includes a plurality of compression springs each of which have a first end in contact with the seal ring means and a second end seated within a recess in the adjacent portion of the rotatable plenum means.

9. In an air jet helicopter, a rotor hub assembly and air distribution system as set forth in claim 7 wherein the slidable seal ring means further includes an elastic O-ring means within a cooperating depression in a generally vertically oriented surface of the seal ring means for maintaining frictional contact with a surface of one of the adjoining structures.

10. In an air jet helicopter, a rotor hub assembly and air distribution system as set forth in claim 7 wherein the seal ring means further includes a friction-resistant means for rotational contact with one of the adjoining structures.

11. In an air jet helicopter, rotor hub assembly and air distribution system as set forth in claim 10 wherein the portion of the adjoining structure in contact with the friction-resistant means is of a wear-resistant material.

12. In an air jet helicopter, a rotor hub assembly and air distribution system as set forth in claim 1 wherein the stationary plenum means is further characterized by being attached to the fuselage adjacent to the thrust bearing means and by having a compressed air inlet located close to said thrust bearing means.

13. In an air jet helicopter, a rotor hub assembly and air distribution system as set forth in claim 12 further comprising a stationary plenum air deflector means adjacent the air inlet for minimizing turbulence and for directing the compressed air upwards into the stationary plenum means.

14. In an air jet helicopter, a rotor hub assembly and air distribution system as set forth in claim 1 further comprising rotatable plenum air deflector means for directing the compressed air into the flexible duct means, for dividing the air flowing therein into substantially equal quantities, and for minimizing turbulence.

* * * * *